United States Patent
Hartmann et al.

(10) Patent No.: US 8,323,137 B2
(45) Date of Patent: Dec. 4, 2012

(54) HYDRAULIC TENSIONING ELEMENT FOR A TRACTION MECHANISM DRIVE

(75) Inventors: Bernd Hartmann, Weisendorf (DE); Werner Petri, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 657 days.

(21) Appl. No.: 12/521,003

(22) PCT Filed: Jan. 15, 2008

(86) PCT No.: PCT/EP2008/050378
§ 371 (c)(1),
(2), (4) Date: Jun. 24, 2009

(87) PCT Pub. No.: WO2008/101750
PCT Pub. Date: Aug. 28, 2008

(65) Prior Publication Data
US 2010/0099528 A1    Apr. 22, 2010

(30) Foreign Application Priority Data
Feb. 22, 2007  (DE) .......................... 10 2007 008 718

(51) Int. Cl.
*F16H 7/08*   (2006.01)
(52) U.S. Cl. ...................................................... 474/110
(58) Field of Classification Search .................. 474/100, 474/109, 110, 111, 138
See application file for complete search history.

(56) References Cited

U.S. PATENT DOCUMENTS

| 4,752,280 A | * | 6/1988 | Brandenstein et al. ........ 474/138 |
| 5,993,341 A | * | 11/1999 | Anderson ...................... 474/110 |
| 6,036,612 A | | 3/2000 | Katogi et al. |
| 6,106,424 A | * | 8/2000 | Kratz ............................. 474/110 |
| 2003/0171179 A1 | | 9/2003 | Okuda et al. |
| 2005/0130777 A1 | * | 6/2005 | Grunau et al. ................. 474/110 |

FOREIGN PATENT DOCUMENTS

| DE | 955749 | 1/1957 |
| DE | 3536834 | 4/1987 |
| DE | 9203759 | 7/1992 |
| DE | 4304389 | 8/1994 |
| DE | 19680338 | 11/1996 |
| DE | 102004047450 | 4/2006 |

* cited by examiner

*Primary Examiner* — William E Dondero
*Assistant Examiner* — Robert T Reese
(74) *Attorney, Agent, or Firm* — Volpe and Koenig, P.C.

(57) ABSTRACT

A hydraulic tensioning element for a traction mechanism drive having a cylinder, having an axially movable piston which is guided in the cylinder, a spring element which is arranged between the cylinder and the piston, a pressure space which is formed in the cylinder, and a reservoir, which is formed in the piston, for hydraulic fluid. A valve permits an exchange of the hydraulic fluid between the pressure space and the reservoir as a function of an actuating movement of the piston. The cylinder (2) has a flanged portion (17) which reduces a size of its opening, and a free end of the piston (4) has formed on it an annular section (16) with a diameter which is larger than the piston diameter.

11 Claims, 1 Drawing Sheet

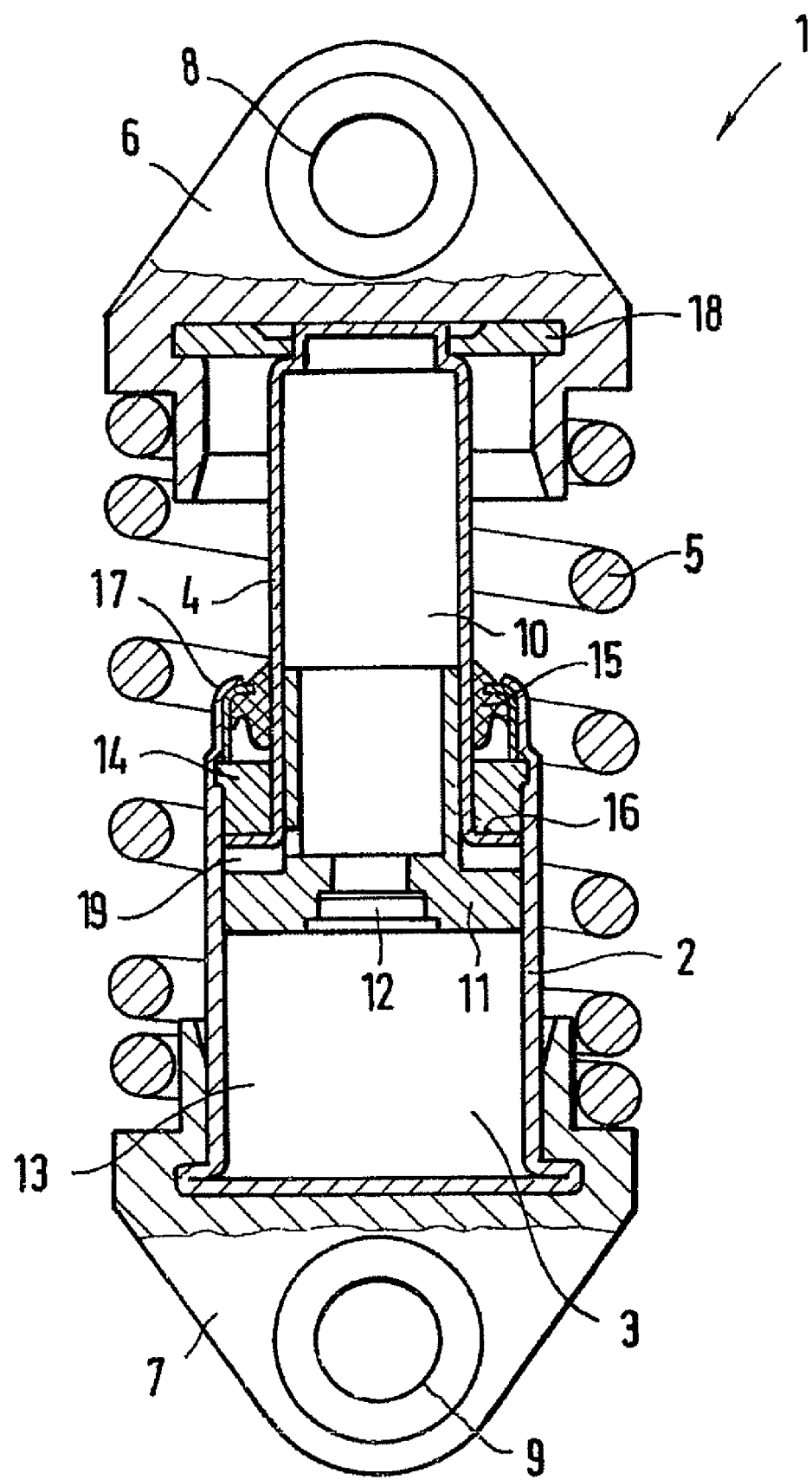

HYDRAULIC TENSIONING ELEMENT FOR A TRACTION MECHANISM DRIVE

BACKGROUND

The invention relates to a hydraulic tensioning element for a traction mechanism drive with a cylinder, a piston that is displaceable in the axial direction and that is guided in the cylinder, a spring element arranged between the cylinder and piston, a pressure space formed in the cylinder, and a supply space formed in the piston for a hydraulic fluid and a valve that allows hydraulic fluid to be exchanged between the pressure space and the supply space as a function of an actuating movement of the piston.

Hydraulic tensioning elements are used in traction mechanism drives for internal combustion engines and are used for tensioning a traction mechanism, for example, a belt or a chain. The tensioning element includes a cylinder that is formed as a stationary and pivotally arranged housing part, and also a piston that is connected directly or indirectly to a tensioning roller. Spring means are arranged between these elements. The spring means could be constructed as a helical compression spring.

From DE 10 2004 047 450 A1, such a hydraulic tensioning element is known. When the piston rod is moved relative to the cylinder, a volume exchange of the hydraulic fluid is carried out between a pressure space in the cylinder and a supply space in the piston, wherein the direction of flow is dependent on the actuating movement of the piston rod. For a movement of the piston rod in the direction of the pressure space, hydraulic fluid can escape into the supply space via a leakage gap set between the piston rod and the cylinder bushing. For a reverse actuating movement of the piston, the hydraulic fluid flows from the supply space into the pressure space via a valve arranged in the base of the pressure space.

Before mounting on an internal combustion engine, the hydraulic tensioning element must be tensioned by the compression of the spring and must be secured in this position. Here, if the mounting tool slips, the piston snaps out of the cylinder due to the effect of the energy stored in the compression spring, wherein, in individual cases, this could even lead to damage to the tensioning element.

SUMMARY

The invention is based on the objective of providing a hydraulic tensioning element whose resistance to snapping apart is improved.

To meet this objective, in a hydraulic tensioning element of the type noted above, it is provided according to the invention that the cylinder has a curled edge reducing its opening and that an annular section with a diameter enlarged relative to the piston diameter is formed on the end of the piston.

The hydraulic tensioning element according to the invention is better protected, in comparison with the state of the art, from damages that could occur, for example, when the biased tensioning element is suddenly unloaded, for example, due to the slipping of a mounting tool. The hydraulic tensioning element according to the invention has a comparatively much more robust construction, because, on one hand, the cylinder has a curled edge in the region of the cylinder opening and, on the other hand, an annular section with an enlarged diameter is formed on the end of the piston in the interior of the cylinder. The hydraulic tensioning element according to the invention is designed so that it can also withstand forces that occur for sudden unloading of the spring element.

In the tensioning element according to the invention, it can be provided that the piston has an advantageously swaged on supporting ring on its end opposite the cylinder. The supporting ring is connected rigidly to the piston and allows a relatively uniform force transfer from the cylinder to a component connected to the supporting ring, for example, a holder like a mounting boss.

In the tensioning element according to the invention, it can be provided that an advantageously reinforced piston rod seal is arranged between the piston and cylinder. The piston rod seal prevents contaminating particles from penetrating into the pressure space.

It is preferred that the valve formed as a non-return valve is arranged in the region of the free end of the piston. For an open valve, when the piston is displaced, the hydraulic fluid can flow from the pressure space into the supply space or in the inverse direction.

According to a first construction of the tensioning element, the valve could be formed as a ball valve advantageously having a spring. Alternatively, the valve could be formed as a plate valve advantageously having a spring.

It is preferred that the spring element is formed as a compression spring surrounding the piston and the cylinder on the outside. With a spring element formed in this way, particularly large tensioning forces can be generated.

In the tensioning element according to the invention, the piston can be produced through deep drawing, advantageously it is made from stainless steel. In the tensioning element according to the invention, the supply space can be filled only partially with hydraulic fluid. The piston and cylinder could have mounting bosses, in order to mount the tensioning element on a motor housing or an assembly.

BRIEF DESCRIPTION OF THE DRAWING

Additional advantages and details of the invention will be described below using an embodiment with reference to the FIGURE.

The FIGURE is a cross-sectional side view of an embodiment of a hydraulic tensioning element according to the invention.

DETAILED DESCRIPTION OF THE PREFERRED EMBODIMENT

The FIGURE shows an embodiment of a hydraulic tensioning element 1 in a cross-sectional view. The tensioning element 1 comprises a pot-shaped cylinder 2 that is produced through deep drawing and that is made from stainless steel with corrosion protection. The cylinder 2 is filled with a hydraulic fluid 3. A piston 4 passes through the opening of the cylinder 2. This piston can be moved axially in the longitudinal direction of the cylinder 2.

The cylinder 2 and piston 4 are surrounded by a spring element formed as a compression spring 5. On both ends, the compression spring 5 is held by spring retaining elements 6, 7 that have mounting bosses 8, 9, respectively.

In the interior of the piston 4 there is a supply space 10 that is filled at least partially with the hydraulic fluid. On its free end, the piston 4 has a circular flange 11 with a diameter that is enlarged compared with the piston diameter. The outer diameter of the flange 11 is adapted to the inner diameter of the cylinder 2, so that a leakage gap for the hydraulic fluid is formed. The leakage gap has a typical gap width of a few μm up to approximately 0.5 mm. Pressure is equalized by hydraulic fluid 3 that passes through the leakage gap and, at the same time, damps the movement of the piston 4. Alternatively, the damping could also be generated by a throttling device (not shown) arranged in another way in the piston or in the flange. In the middle of the flange 11 there is a valve 12 that is formed in the shown embodiment as a plate valve. In other constructions, a ball valve could also be provided. In both constructions, a moving valve body, for example, a ball, could be loaded by a spring element, in order to close the valve. A closed valve prevents hydraulic fluid 3 from flowing from the supply space 10 in the piston 4 into a pressure space 13 formed in the interior of the cylinder 2.

As shown in the FIGURE, a ring 14 is fixed in place between the flange 11 and the upper end section of the cylinder 2. A reinforced piston rod seal 15 prevents the penetration of contaminating particles into the pressure space 13. For the mounting of the hydraulic tensioning element 1 on an internal combustion engine, under the most unfavorable conditions, it could happen that the compressed compression spring 5 is suddenly unloaded, for example, when the mounting tool slips. As a result, the flange 11 suddenly impacts the end section 16 of the piston 4 extending in the radial direction. The force is transferred via the ring 14 to the end section of the cylinder 2 that has a curled edge 17 reducing its opening. This curled edge is capable of withstanding the forces that occur. Thus, the curled edge 17 and the end section 16 of the piston 4 prevent the occurrence of damages that could possibly lead to unsealed areas.

On its upper end, the piston 4 has a swaged on supporting ring 18 that causes a uniform introduction of force into the spring retaining element 6.

When the hydraulic tensioning element 1 is compressed while the belt drive of an internal combustion engine is operating, the piston 4 is pressed toward the cylinder 2, so that the hydraulic fluid 3 in the cylinder 2 is set under pressure by the displacement of the flange 11 connected to the piston 4. The hydraulic fluid 3 flows through the leakage gap into the supply space 10 in the piston 4. In addition, the hydraulic fluid 3 also flows into an annular space 19 that is defined in the axial direction by the upper side of the flange 11 and, in the radial direction, by the inside of the cylinder 2. The piston 4 has a lateral opening, so that hydraulic fluid can flow from the annular space 19 into the supply space 10. The farther the piston 4 moves inward, the larger the annular space 19 becomes. Because the annular space 19 or the supply space 10 is filled only partially with the hydraulic fluid 3, the pressure is advantageously less strongly dependent on the instantaneous position of the piston 4.

LIST OF REFERENCE SYMBOLS

1 Tensioning element
2 Cylinder
3 Hydraulic fluid
4 Piston
5 Compression spring
6 Spring retaining element
7 Spring retaining element
8 Mounting boss
9 Mounting boss
10 Supply space
11 Flange
12 Valve
13 Pressure space
14 Ring
15 Piston rod seal
16 End section
17 Curled edge
18 Supporting ring
19 Annular space

The invention claimed is:

1. Hydraulic tensioning element for a traction mechanism drive, comprising a cylinder, a piston that can move in an axial direction and that is guided in the cylinder, a spring element arranged between the cylinder and the piston, a pressure space formed in the cylinder and a supply space formed in the piston for hydraulic fluid, and a valve that allows an exchange of the hydraulic fluid between the pressure space and the supply space as a function of an actuating movement of the piston, the cylinder has a curled edge reducing an opening thereof and, an annular section is formed on a free end of the piston with a diameter that is enlarged compared with a diameter of the piston and is adapted to an inner diameter of the cylinder, the piston at its free end has a flange with a diameter that is enlarged compared with the diameter of the piston and is adapted to the inner diameter of the cylinder with a leakage gap located therebetween, an annular space is defined between the flange, the annular section, and an inner wall of the cylinder, wherein upon movement of the piston into the cylinder the hydraulic fluid is adapted to flow from the pressure space to the supply space via a flow path defined by the leakage gap, the annular space, and a lateral opening that extends to the supply space in the piston.

2. Tensioning element according to claim 1, wherein the piston has, on its end opposite the free end, a swaged on supporting ring.

3. Tensioning element according to claim 1, wherein a reinforced piston rod seal is arranged between the piston and the cylinder.

4. Tensioning element according to claim 1, wherein the valve is formed as a non-return valve and is arranged in a region of the free end of the piston.

5. Tensioning element according to claim 4, wherein the valve is formed as a ball valve having a spring.

6. Tensioning element according to claim 4, wherein the valve is formed as a plate valve having a spring.

7. Tensioning element according to claim 1, wherein the spring element is formed as a compression spring surrounding the piston and the cylinder on an outside thereof.

8. Tensioning element according to claim 1, wherein the piston comprises a deep drawn stainless steel part.

9. Tensioning element according to claim 1, wherein the supply space is filled only partially with hydraulic fluid.

10. Tensioning element according to claim 1, wherein the flange includes a support part that extends into the piston and defines an inner side of the annular space.

11. Tensioning element according to claim 1, wherein the lateral opening is located in the support part.

* * * * *